US006862604B1

(12) United States Patent
Spencer et al.

(10) Patent No.: US 6,862,604 B1
(45) Date of Patent: Mar. 1, 2005

(54) REMOVABLE DATA STORAGE DEVICE HAVING FILE USAGE SYSTEM AND METHOD

(75) Inventors: Andrew M. Spencer, Eagle, ID (US); Todd C. Adelmann, Boise, ID (US); Margo N. Whale, Kuna, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 443 days.

(21) Appl. No.: 10/050,498

(22) Filed: Jan. 16, 2002

(51) Int. Cl.[7] .............................................. G06F 17/30
(52) U.S. Cl. ...................................................... 707/205
(58) Field of Search ........................................ 707/205

(56) References Cited

U.S. PATENT DOCUMENTS

| | | | | |
|---|---|---|---|---|
| 4,122,519 A | * | 10/1978 | Bielawski et al. .......... | 707/200 |
| 5,905,993 A | | 5/1999 | Shinohara .................... | 711/103 |
| 5,986,992 A | * | 11/1999 | Bardmesser ................ | 369/77.2 |
| 6,145,046 A | * | 11/2000 | Jones .......................... | 710/301 |
| 6,189,016 B1 | * | 2/2001 | Cabrera et al. ............. | 707/203 |
| 6,212,512 B1 | * | 4/2001 | Barney et al. ................ | 707/1 |
| 6,226,202 B1 | | 5/2001 | Kikuchi ................. | 365/185.33 |

FOREIGN PATENT DOCUMENTS

| EP | 1107103 A2 | * | 6/2001 | ............. G06F/3/06 |
|---|---|---|---|---|

* cited by examiner

*Primary Examiner*—Jack M Choules

(57) ABSTRACT

A removable data storage device is provided that is used with electronic devices using compact data storage capabilities. The removable data storage device includes memory for storing data files and a file management information that includes memory allocation information of the memory. A scan logic is provided that analyzes the file management information and generates file usage data of the memory. With th present invention, a removable data storage device can self-analyze its memory contents and determine, for example, types of files and memory space consumed by each file type in the memory.

29 Claims, 3 Drawing Sheets

REMOVABLE DATA STORAGE DEVICE HAVING FILE USAGE SYSTEM AND METHOD

FIELD OF THE INVENTION

The invention relates to the removable data storage device arts. It finds particular application to a removable storage device that has a file usage system and method. It will be appreciated that the present invention will find application in a variety of removable storage devices such as a memory card, PC card, floppy disks, CD read/write disks, USB memory devices (e.g. Key Fob with USB interface that contains flash memory and a controller) or other removable storage device that stores data. The present invention also finds application in any electronic device that uses one or more removable storage devices.

BACKGROUND OF THE INVENTION

A memory card, such as a flash memory card, is a mass storage device. It typically includes a form of storage memory such as flash electrically erasable programmable read only memories ("flash EEPROMs"), controller electronics and an electrical connector as part of a package that is smaller than a 3.5 inch floppy disk. Other types of storage or memory cards include micro drives. The memory card is typically used in portable devices such as cellular phones, personal digital assistants (PDA), digital cameras etc. to store data and can be connected to a general purpose personal computer to transfer data therebetween.

The storage memory is a nonvolatile memory that can be programmed by a user. Once programmed, the storage memory retains its data until over-written or erased. The prior art flash memory card allows for the storage of data files and application programs on the purely solid-state medium of flash EEPROMs. Similarly, the prior art micro drive memory card allows for the storage of data files and application programs on rotating magnetic media. Both contain, system resident controllers that permit the memory card to function as if it were a physical disk drive. The memory card thus provides an alternative to both a fixed hard disk and a floppy disk in a computer operating system for the storage of data. Like a physical disk drive, the host system uses a file management scheme, such as specified ISO/IEC standard ISO/IEC 9293:1994, to manage data files stored in the memory card. This file management scheme includes the requirement that a file allocation table, used to describe the location of each file and the amount of memory it uses, be recorded on the storage memory and define directory entry fields that describe the attributes, including name, name extension and size, of each file.

However, when the prior art memory cards were transferred to a general purpose computer, the computer would perform file analysis to determine the attributes of the contents of the card's memory. This required additional processing time.

The present invention provides a new and useful removable data storage device and method that cures the above problems and others.

SUMMARY OF THE INVENTION

In accordance with one embodiment of the present invention, a removable data storage device is provided. The storage device includes a memory that stores data files. A controller controls data communication between the memory and a host. A file management information structure includes memory allocation information of each data file stored in the memory. A file usage data structure maintains file usage data of the data files stored in the memory based on the memory allocation information In accordance with another embodiment of the present invention, a method of determining file usage information in a removable data storage device is provided. The removable data storage device includes file management information that characterizes one or more files stored within the removable data storage device. The method comprises self-scanning the file management information and determining file characteristics for each file stored in the removable data storage device based on the file management information. File usage information is determined and accumulated based on the determined file characteristics and changes to the file management information.

One advantage of the present invention is that processing time is reduced when downloading data from a removable storage device to a host device since file usage information is maintained by the removable storage device.

Still further advantages of the present invention will become apparent to those of ordinary skill in the art upon reading and understanding the following detailed description of the illustrated embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The following includes definitions of exemplary terms used throughout the disclosure. Both singular and plural forms of all terms fall within each meaning:

"Software", as used herein, includes but is not limited to one or more computer executable instructions, routines, algorithms, modules or programs including separate applications or code from dynamically linked libraries for performing functions and actions as described herein. Software may also be implemented in various forms such as a stand-alone program a servlet, an applet, code stored in a memory, or other type of executable instructions.

"Logic", as used herein, includes but is not limited to hardware, firmware, software and/or combinations of both to perform a function(s) or an action(s). Logic also includes a software controlled microprocessor or discrete logic such as an application specific integrated circuit (ASIC).

Figure 1:
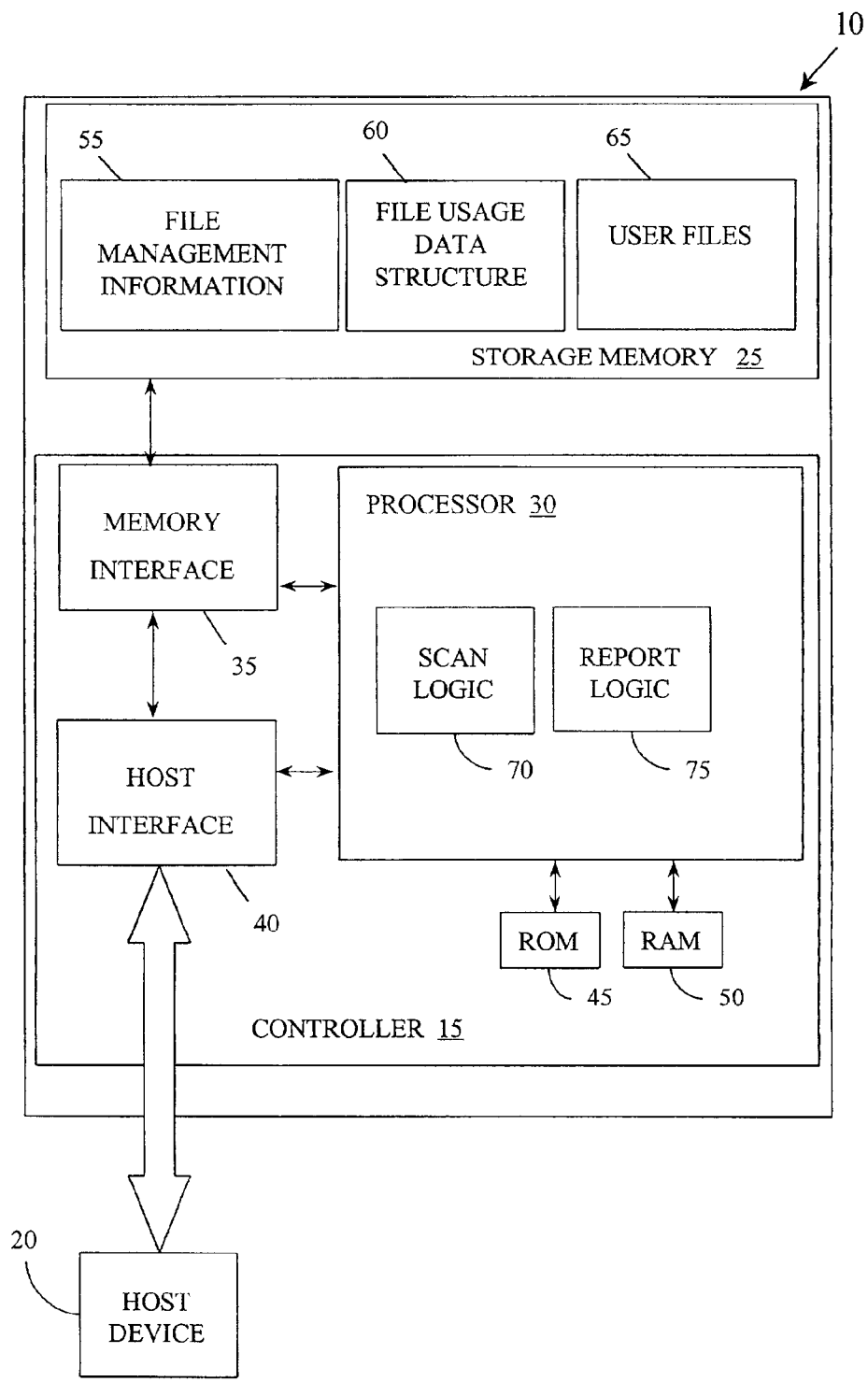
FIG. 1 is an exemplary overall system diagram of a removable storage device in accordance with one embodiment of the present invention.

Illustrated in FIG. 1 is a block diagram of a removable data storage device 10 in accordance with one embodiment of the present invention. An exemplary storage device is a memory card and will be described with reference thereto.

In the illustrated embodiment, it includes a controller 15 that controls communication of data between a host device 20 and a storage memory 25. The communication may be in accordance with any known protocol such as Compact Flash requirements, Secure Digital, MultiMediaCard, Memory Stick, or ATA/ATAPI requirements that specify communication requirements between a host device and a storage device. The memory card 10 is typically inserted into and connected to the host device 20 to serve as its memory and/or data storage device for data that the device generates or otherwise processes. The connection is made by pins or other connection port (not shown) located on the exterior of the memory card. The host device may be a electronic device such as a digital camera, an MP3 player, a personal digital assistant (PDA), a cell phone or the like. The host device 20 in these applications typically has a small portable size and limited processing power as opposed to a general purpose computer, thus, benefiting from the use of a compact memory card.

The controller 15 includes a processor 30, memory interface logic 35, host interface logic 40, code storage memory 45 and random access memory (RAM) 50. The controller 15 operates the memory card and controls execution of read and write operations of data to and from the storage memory 25 where the data is stored as data files. As known in the art, the storage can be a flash memory, a micro drive or other memory which is a non-volatile, low-power consumption semiconductor memory formed of one or more integrated circuit (IC) chips, or other technology that can be electrically reprogrammed. The memory interface logic 35 controls the addressing of the storage memory 25 and manages the date flow to and from the storage memory 25 and the host interface 40. The host interface logic 40 sends or takes the data to or from the host in the format recognized by the host and formats the data into a form usable by the memory interface logic 35. The processor 30 manages the operation of the host interface logic 40 and memory interface logic 35 as well as perform other non data functions of the card 10. The code storage memory 45, which is typically a read only memory (ROM) 35, holds software and other data required for the operation of the processor 30 such as an operating system. The random access memory (RAM) 50 holds various data used during the operation of the card 10 as is known in the art In the following explanation, a digital camera is used as an exemplary host device 20. As the camera generates images, the controller 15 stores them as user files 65 in the storage memory 25 in response to an instruction(s) from the camera's processing unit. File management information 55 contains tables of memory allocation information that describe characteristics of files, directories and free space within the storage memory 25. The file management information is used by the host 20 to manage the contents of the storage memory 25 so it can determine where there is free space to add files and where files to be deleted are located. Each time data is modified in the storage memory 25, for example, by writing new data, moving data, deleting data, the file management information 55 is updated to reflect those modifications.

The file management information, for example, includes tables that contain a name of a given data file, number of sectors or clusters allocated to the data file (e.g. if the memory is acting as a disk drive), location of the file (e.g. start address), any mapping addresses if the file is spread over multiple locations, a file type, a file size, volume label information, etc. A table is, for example, a file allocation table. A directory, for example, lists a name, size, modification time and starting cluster of each file or sub-directory it contains. The file management information reflects the current state of the memory but does not track the usage of it over time.

With further reference to FIG. 1, within the functions of the memory card 10, a scan logic 70 allows the memory card to perform self-analysis of its memory using the file management information 55. In particular, the scan logic 70 determines file usage information by reading the contents of the file management information 55 tables and maintains file usage information accumulated over a time period. In one embodiment, the scan logic is software executable by the controller processor 30. This information allows the scan logic 70 to determine the characteristics of the data files stored, previously stored, or processed in the storage memory 25 so that file usage information can be accumulated.

For example, the scan logic 70 determines the types of files stored and how much memory they consume as a file type or in aggregate from the current state of the file management information 55. In another example, the scan logic can be programmed to determine for each type of file a variety of file usage information such as the number of read only and re-writable files, the number of different authors, the number of times a file was accessed, the number of different owners of a file, the number of files per owner. Accumulated or history usage information is that information which tracks the changes in the file management information each time it is updated. This information could include, but is not limited to, the number of files deleted, copied, moved and/or having their access rights changed (e.g. from read only to re-writable). This information can be accumulated by file type, in aggregate, and/or over selected date ranges. With this feature, the memory card can self-scan and self-analyze itself without requiring a computer to perform the scanning and file usage analysis.

The file usage information is maintained in a file usage data structure 60 that is generated and periodically updated with new file usage information from the scan logic 70. In one embodiment, the file usage data structure includes summary information for each type of data file stored within the storage memory 25. For example, for each file type, a count is accumulated that represents a total number of data files of that type. Also, a total size of all files of that file type is accumulated representing a total amount of space a particular file type occupies in the storage memory 25. In addition, counts of file operations can be accumulated such as the number of files of that type that have been added, deleted, moved and/or copied over the usage life of the card and/or over a selected time range. It will be appreciated that the file usage data structure 60 can be a single data structure, multiple data structures associated together, and/or separate data structures. The specific implementation is left to the designer.

With further reference to FIG. 1, within the functions of the memory card 10, there is a report logic 75 that extracts the file usage information from the file usage data structure 60 and generates a summary report that can be transmitted to a general purpose computer or host device. Thus, the computer or host device is not required to analyze the file management information 55 of the memory card 10 thereby reducing processing time and storage space of the file usage information on the computer or host device. This benefit is realized, for example, when downloading or transferring the contents of the memory card to the general purpose computer or other host device.

On the host device side, it would include software that reads data from the summary report and/or from the file usage data structure directly, formats it if necessary and presents it to the user to assist in managing the data of the storage device. The host device can indicate various information to the user based on the file usage data such as the number of file types, the total number of files of a particular file type, the number of files that are grouped by a date range to determine their age, and/or grouped by another characteristic. One of ordinary skill in the art will appreciate that the host device software can also be programmed to perform additional analysis and/or statistics on the file usage data depending on the user's needs.

Figure 2:
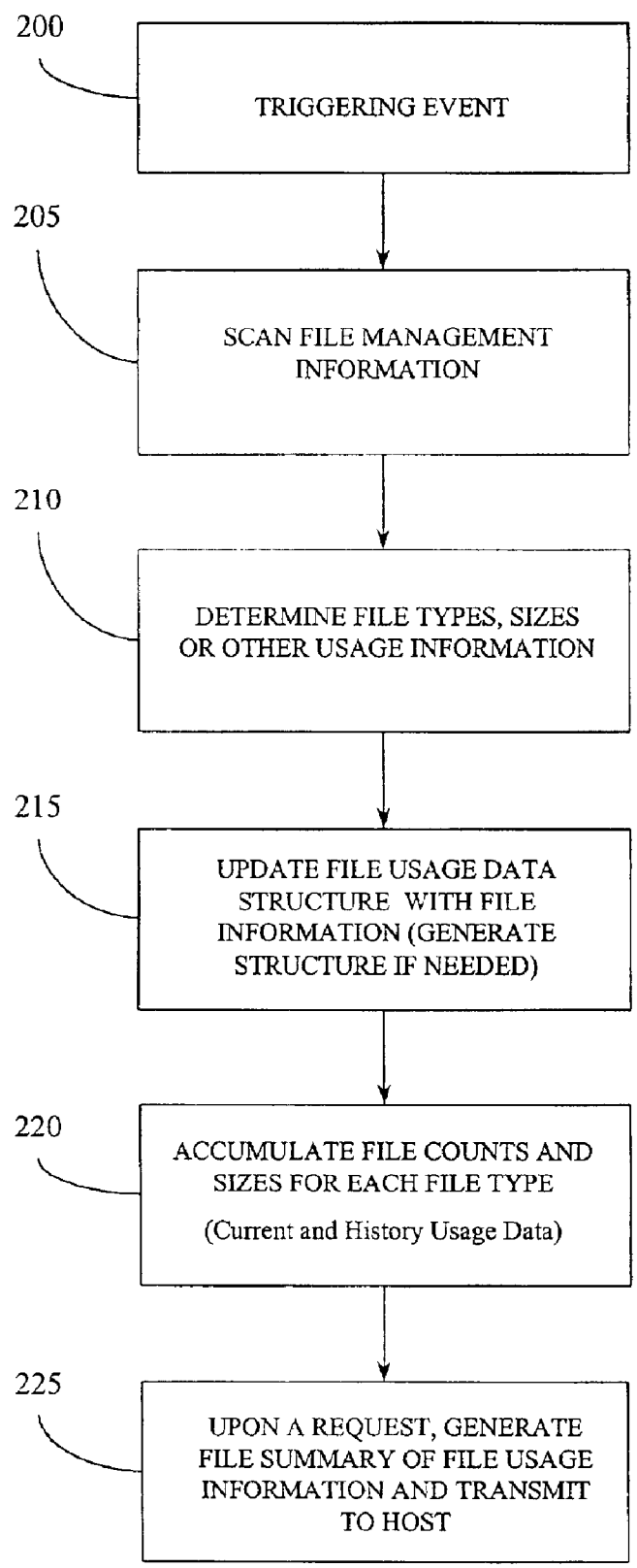
FIG. 2 is an exemplary methodology of determining file usage information in accordance with one embodiment the present invention.

Illustrated in FIG. 2 is an exemplary methodology of the system shown in FIG. 1 for generating and maintaining file usage information in accordance with the present invention. As illustrated, the blocks represent functions, actions and/or events performed therein by computer software instructions or groups of instructions. Alternatively, the blocks represent steps performed by functionally equivalent circuits such as a digital signal processor circuit, an application specific integrated circuit (ASIC) or other logic. Of course, a combination of hardware and software can be implemented. The flow diagram does not depict syntax of any particular programming language. Rather, the flow diagram illustrates the functional information one skilled in the art requires to generate computer software or to fabricate circuits that perform the processing of the system. It will be appreciated that electronic and software applications involve dynamic and flexible processes such that the illustrated blocks can be performed in other sequences different than the one shown. It will also be appreciated by one of ordinary skill in the art that elements embodied as software may be implemented using various programming approaches such as machine language, procedural, object oriented, artificial intelligence or other techniques as known in the art.

Figure 3:
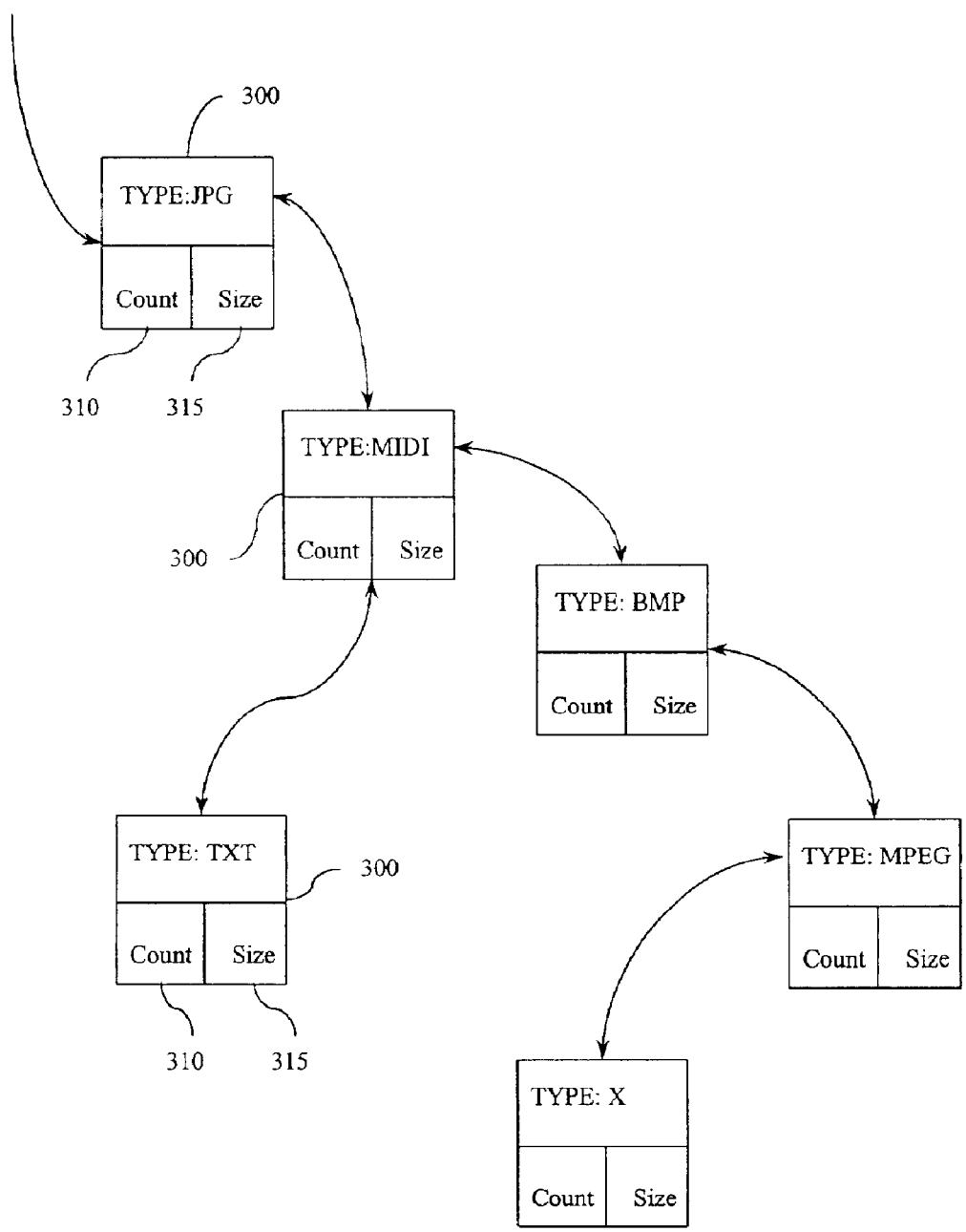
FIG. 3 is an exemplary data structure for maintaining file usage information in accordance with one embodiment of the present invention.

With reference to FIG. 2, the methodology of the illustrated embodiment is explained from a point where the file usage data structure has already been defined and generated, thus, ready to accept file usage information. An exemplary data structure is illustrated in FIG. 3 as a linked list tree structure having a node for each file type. In the memory card, the operating system of the controller 15 is configured to respond to a triggering event (block 200) and initiates the scan logic 70. Exemplary triggering events include when the memory card is powered up, upon a command to initiate (user or system command), when the memory card detects that the memory that holds the file management information 55 has just been updated, at the time of a write operation to the storage memory 25 and/or other operation that changes the file contents or file organization of the memory 25. The triggering event may also be a command from a user, the host device, and/or self-triggered. After the triggering event, the file management information tables are scanned (block 205) and file types, sizes or other desired information, including file deletions or moves are determined (block 210) from the information stored within the tables. The file usage data structure 60 is then updated with the new file usage information (block 215). Of course, it will be appreciated that the data structure may be pre-generated at any time.

For each file type, a number of file counts is accumulated that represents the total number of files for each file type. The size of each file for a particular file type is accumulated to determine a total size of memory consumed by that particular file type. As seen in FIG. 3, the exemplary linked list includes a node 300 for each file type and maintains current usage data such as a total count 310 of the number of files of that file type and a total memory size 315 consumed by all the files of that type. Other desired current usage information, such as the location of each file in memory, can also be maintained. Also, other types of history usage data can be accumulated such as counts of the number of files deleted, moved, copied or added. In general, history usage data is data that cannot be obtained from the current state of the memory but rather is tracked from operations performed on the files in the memory 25. Exemplary file types include JPEG (JPG), MIDI, bitmap (BMP), MPEG, and other file types as known to one of ordinary skill in the art. Upon a request, a file usage summary is generated from the file usage data structure by traversing the tree and extracting the corresponding information from each node (block 225).

When a file type is found in the file allocation table that does not have an associated node in the linked list, a new node is added in the linked list. It will be appreciated that the file usage data structure 60 can be implemented in many different ways. For example, as a linked list or other tree structure, each node can have one or more address links including forward and/or backward links. The nodes can include other configurations containing different file usage information. For example, a root node can designate a file size range (or a threshold size) and all files having a size within the range (or above/below the threshold) are stored as child nodes. With this configuration, the system can quickly determine which particular files are consuming the most memory space regardless of file type. In another embodiment, the data structure 60 is a database or data table storing the file usage information as records, columns and rows, a sequential list or the like.

With the present invention, a file management information scan logic, file usage data structure and report logic are embedded within a removable storage device that provides the capability of determining file usage information. By having the removable storage device predetermine the file usage information, processing time and storage space can be reduced on a general purpose computer or other host device as the removable storage device performs these operations. In addition, with the removable storage device predetermining file usage information, information that is no longer available in the file management information, for example the number of deleted files, can be retained if desired. The file usage information may also be displayed directly to a user of a connected device such as a digital camera or cellular telephone allowing the user to make decisions concerning the organization of data files stored on the removable storage device. For example, a user may delete certain file types that are consuming too much memory.

While the present invention has been illustrated by the description of embodiments thereof, and while the embodiments have been described in considerable detail, it is not the intention of the applicants to restrict or in any way limit the scope of the appended claims to such detail. For example, multiple file usage data structures can be maintained on the removable storage device, each storing different types of file usage information or additional file usage attributes can be accumulated in structure nodes. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept

We claim:

1. A removable data storage device comprising:
   a memory for storing data files;
   a controller that controls data communication between the memory and a host;
   a file management information structure including memory allocation information of each data file stored in the memory; and
   a file usage data structure for maintaining file usage data of the data files stored in the memory based on the memory allocation information, the removable data storage device being configured to determine and store the file usage data.

2. The removable data storage device as set forth in claim 1 further including a scan logic for scanning the memory allocation information of the file management information and updating the file usage data structure based on the memory allocation information and updates to the memory allocation information.

3. The removable data storage device as set forth in claim 2 wherein the scan logic is one of an embedded software on the removable data storage device including instructions executable by a processor, an embedded hardware device, or a combination of both.

4. The removable data storage device as set forth in claim 1 wherein the file management information includes at least a file allocation table having a file type and a file size for each data file.

5. The removable data storage device as set forth in claim 1 wherein the file usage data includes at least one of current usage data and history usage data.

6. The removable data storage device as set forth in claim 5 wherein the current usage data includes, for each file type of the data files, a count value and a size value, and the history usage data includes counts for additions, deletions, moves, and copies for each file type.

7. The removable data storage device as set forth in claim 1 further including a report logic that generates a file summary of the file usage data structure.

8. The removable data storage device as set forth in claim 1 wherein the removable data storage device is a memory card.

9. The removable data storage device as set forth in claim 1 wherein the memory is a non volatile storage memory.

10. A method of determining file usage information in a removable data storage device where the removable data storage device includes file management information that characterizes one or more files stored within the removable data storage device, the method comprising:
    self-scanning the file management information;
    determining file characteristics for each file stored in the removable data storage device based on the file management information; and
    determining and accumulating file usage information based on the determined file characteristics and changes to the file management information.

11. The method as set forth in claim 10 further including providing a scan logic embedded within the removable data storage device.

12. The method as set forth in claim 10 wherein the determining file characteristics includes determining a file type and a file size for each file as well as counts for operations performed on a file.

13. The method as set forth in claim 12 wherein the accumulating includes, for a particular file type, accumulating a total number of files having the particular file type and a total size occupied in the removable data storage device by files having the particular file type as well as accumulation counts for at least one of additions, deletions, moves, and copies for a particular file type.

14. The method as set forth in claim 10 wherein the self-scanning is performed in response to a triggering event.

15. The method as set forth in claim 10 further including maintaining the file usage data in a data structure stored within the removable data storage device.

16. In an electronic device that generates data and includes a removable data storage device, the removable data storage device comprising:
    a memory;
    a controller that controls data communication between the memory and stores the data generated by the electronic device as data files within the memory;
    a file management information structure containing data that represents a current state of the data files in the memory;
    a scan logic that analyzes the file management information and generates file usage information over a time period; and
    a file usage data structure for maintaining the file usage information.

17. The removable data storage device as set forth in claim 16 wherein the scan logic is embodied as software executable by the controller, a hardware device, or a combination of both.

18. The removable data storage device as set forth in claim 16 wherein the file usage data structure is a linked list tree structure.

19. The removable data storage device as set forth in claim 16 wherein the file usage information includes data types of the data files stored in the memory and an amount of space occupied by each data type and locations of the data files in the memory.

20. The removable data storage device as set forth in claim 16 wherein the memory is non volatile storage memory.

21. The removable data storage device as set forth in claim 16 wherein the file usage information includes at least one of current usage information and history usage information.

22. A removable data storage device, comprising:
    a memory;
    a controller that controls data communication between the memory and a host;
    a processor coupled to the controller, and logic, executable by the processor, configured to determine file usage information of the memory.

23. The removable data storage device of claim 22 wherein the logic is configured to read file management information tables and maintains, in the memory, file usage information accumulated over a time period.

24. The removable data storage device of claim 22 wherein the logic is further configured to determine characteristics of data files currently stored in the memory.

25. The removable data storage device of claim 24 wherein the characteristics comprise types of files stored in the memory and how much memory the types of files consume.

26. The removable data storage device of claim 24 wherein the characteristics comprise a number of read only and re-writable files and a number of times a file was accessed.

27. The removable data storage device of claim 24 wherein the characteristics comprise a number of different owners of a file and a number of files per owner.

28. The removable data storage device of claim 22 wherein the logic being further configured to determine historical usage information that comprises a number of files deleted and copied.

29. The removable data storage device of claim 22 wherein the logic is configured to analyze the file usage information and generate a report that can be transmitted to the host.

* * * * *